and, upon receipt thereof, generates a magnetic field force that
United States Patent Potter et al.

(10) Patent No.: US 7,852,183 B2
(45) Date of Patent: Dec. 14, 2010

(54) POWER DRIVE UNIT ELECTROMAGNETIC LATCH

(75) Inventors: Calvin C. Potter, Mesa, AZ (US); Casey Hanlon, Queen Creek, AZ (US); Paul T. Wingett, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 552 days.

(21) Appl. No.: 11/433,118

(22) Filed: May 12, 2006

(65) Prior Publication Data

US 2007/0109082 A1 May 17, 2007

Related U.S. Application Data

(60) Provisional application No. 60/736,819, filed on Nov. 14, 2005, provisional application No. 60/736,977, filed on Nov. 14, 2005, provisional application No. 60/763,185, filed on Jan. 26, 2006.

(51) Int. Cl.
*H01F 7/14* (2006.01)
*H02K 7/10* (2006.01)
*H02K 49/00* (2006.01)
*H02P 15/00* (2006.01)

(52) U.S. Cl. .......................... 335/272; 310/77; 310/92; 310/93

(58) Field of Classification Search ......... 335/296–306; 310/77, 92–93, 156.45, 181
See application file for complete search history.

(56) References Cited

U.S. PATENT DOCUMENTS

| 2,837,670 | A | * | 6/1958 | Thomas et al. ............ 310/49 R |
| 3,344,378 | A | | 9/1967 | Wilhelmson |
| 3,423,617 | A | * | 1/1969 | Kohlhagen ................ 310/49 R |
| 3,466,518 | A | * | 9/1969 | Aylikci et al. ............... 318/685 |
| 3,855,560 | A | | 12/1974 | Ward |
| 3,934,216 | A | | 1/1976 | Ward |
| 3,984,711 | A | * | 10/1976 | Kordik ..................... 310/49 R |
| 4,315,171 | A | * | 2/1982 | Schaeffer ................. 310/49 R |
| 4,441,675 | A | * | 4/1984 | Boehringer et al. ......... 244/213 |

(Continued)

OTHER PUBLICATIONS

Potter, C.; Compact, Electromagnetically Braked Actuator Assembly, May 15, 2008, U.S. Appl. No. 12/120,938.

(Continued)

*Primary Examiner*—Elvin G Enad
*Assistant Examiner*—Alexander Talpalatskiy
(74) *Attorney, Agent, or Firm*—Ingrassia Fisher & Lorenz, P.C.

(57) ABSTRACT

A no-back device for a power drive unit is configured such that, during operation of the power drive unit, the no-back device does not supply magnetic or frictional force against power drive unit rotation. The no-back device is implemented either redundantly or no-redundantly, and includes a latch rotor and an electromagnet. In both embodiments, the latch rotor is coupled to the power drive unit to rotate therewith, and the electromagnet is coupled to receive a flow of current and, upon receipt thereof, generates a magnetic field force that opposes rotation of the latch rotor. In the redundant embodiment, the no-back device further includes one or more permanent magnets, and the magnetic field generated by the electromagnet selectively opposes or aids the magnetic field supplied by the permanent magnet(s).

12 Claims, 6 Drawing Sheets

U.S. PATENT DOCUMENTS

| | | | | |
|---|---|---|---|---|
| 4,500,861 | A | * | 2/1985 | Nelson .................. 335/253 |
| 4,563,606 | A | * | 1/1986 | Fukasawa et al. ........... 310/208 |
| 4,647,889 | A | | 3/1987 | Addis |
| 4,673,852 | A | * | 6/1987 | Geiger .................. 388/823 |
| 4,766,362 | A | * | 8/1988 | Sadvary ................. 322/50 |
| 4,843,270 | A | * | 6/1989 | Dijken .................. 310/208 |
| 5,043,618 | A | * | 8/1991 | Stephenson ............... 310/168 |
| 5,087,845 | A | | 2/1992 | Behrens et al. |
| 5,175,462 | A | * | 12/1992 | Yoshino et al. ............. 310/164 |
| 5,233,252 | A | | 8/1993 | Denk |
| 5,281,094 | A | | 1/1994 | McCarty et al. |
| 5,327,069 | A | * | 7/1994 | Radun et al. .................. 322/10 |
| 5,444,318 | A | * | 8/1995 | Stumpf .................. 310/77 |
| 5,548,173 | A | * | 8/1996 | Stephenson ............... 310/181 |
| 5,625,276 | A | * | 4/1997 | Scott et al. .................. 322/24 |
| 5,631,511 | A | | 5/1997 | Schulmann et al. |
| 5,677,581 | A | | 10/1997 | Yoshida et al. |
| 5,712,520 | A | | 1/1998 | Lamb |
| 5,914,576 | A | | 6/1999 | Barba |
| 5,920,139 | A | * | 7/1999 | Fujiwara et al. ........ 310/154.11 |
| 5,936,386 | A | * | 8/1999 | Heglund ..................... 322/94 |
| 5,986,370 | A | | 11/1999 | Cheng |
| 6,012,347 | A | | 1/2000 | Hasegawa |
| 6,018,200 | A | * | 1/2000 | Anderson et al. ......... 290/40 B |
| 6,020,804 | A | | 2/2000 | Gandel |
| 6,079,303 | A | | 6/2000 | Lyachovitsky |
| 6,097,123 | A | | 8/2000 | Weiss et al. |
| 6,100,619 | A | | 8/2000 | Buscher et al. |
| 6,177,746 | B1 | * | 1/2001 | Tupper et al. ................ 310/166 |
| 6,252,325 | B1 | * | 6/2001 | Nashiki ..................... 310/168 |
| 6,262,508 | B1 | * | 7/2001 | Shibayama et al. ......... 310/181 |
| 6,325,331 | B1 | * | 12/2001 | McKeown ................ 244/76 A |
| 6,380,733 | B1 | | 4/2002 | Apel et al. |
| 6,507,257 | B2 | | 1/2003 | Mohler |
| 6,518,685 | B2 | | 2/2003 | Nelson |
| 6,661,206 | B2 | * | 12/2003 | Gallegos-Lopez ............. 322/23 |
| 6,700,271 | B2 | * | 3/2004 | Detela ....................... 310/164 |
| 6,777,842 | B2 | * | 8/2004 | Horst .................... 310/154.11 |
| 6,812,816 | B1 | | 11/2004 | Easton |
| 6,879,072 | B2 | | 4/2005 | Frey et al. |
| 6,946,938 | B1 | * | 9/2005 | Pedersen .................... 335/296 |
| 6,956,453 | B2 | | 10/2005 | Osterberg |
| 7,030,724 | B2 | * | 4/2006 | Pedersen .................... 335/296 |
| 7,135,947 | B2 | * | 11/2006 | Engel ........................ 335/128 |
| 7,306,535 | B2 | | 12/2007 | Menjak et al. |
| 2004/0021390 | A1 | * | 2/2004 | Kim et al. .................... 310/191 |
| 2005/0247529 | A1 | * | 11/2005 | Gaines et al. ............... 188/72.8 |

OTHER PUBLICATIONS

Office Action mailed Jan. 5, 2010, for U.S. Appl. No. 12/120,938.
Response to U.S. Office Action dated Mar. 29, 2010, for U.S. Appl. No. 12/120,938.
Part B—Fee(s) Transmittal dated Jul. 14, 2010, for U.S. Appl. No. 12/120,938.
Notice of Allowance and Fee(s) Due mailed Apr. 26, 2010, for U.S. Appl. No. 12/120,938.

* cited by examiner

FIG. 10

POWER DRIVE UNIT ELECTROMAGNETIC LATCH

CROSS-REFERENCE TO RELATED APPLICATIONS

This application claims the benefit of U.S. Provisional Application No. 60/736,819 filed Nov. 14, 2005, U.S. Provisional Application No. 60/736,977 filed Nov. 14, 2005, and U.S. Provisional Application No. 60/763,185 filed Jan. 26, 2006.

TECHNICAL FIELD

The present invention relates to actuators and, more particularly, to an electromagnetic latch for holding an actuator in position.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. In many applications such as, for example, aircraft flight surface control systems and aircraft thrust reverser actuation systems, the actuators include power drive units, such as motors, that are configured to receive a source of drive power to move an actuator element, and thus the control surfaces or components, to a commanded position. When the control surfaces or components reach the commanded position, the source of drive power may be removed. Thus, many of the actuators that are used include what is sometimes referred to as a no-back device. The no-back device is configured to hold the actuator in position against the load once the actuator has moved the control surface or component to the commanded position.

The types and configurations of no-back devices that are included in actuators vary. One particular type of no-back device that is used is a permanent magnet device. This type of device typically includes one or more permanent magnets that prevent rotation of the actuator power drive unit when the source of drive power is removed. Although this type of no-back device, as well as the various other device types that are currently known, is generally safe, reliable, and robust, these devices do suffer certain drawbacks. For example, the current devices are a continuous supply of magnetic force against drive unit rotation, in at least one rotational direction, that the drive unit may need to overcome each time it is supplied with drive power. As a result, the size of the power drive unit may be larger than what is needed to move the load alone, in order to overcome this magnetic force, which can increase overall actuator and system size, weight, and costs.

Hence, there is a need for a power drive unit no-back device that does not supply magnetic force against drive unit rotation, and/or does not result in increased overall actuator and system size, weight, and/or costs. The present invention addresses at least one or more of these needs.

BRIEF SUMMARY

The present invention provides a power drive unit no-back device that does not supply magnetic force against drive unit rotation during power drive unit operation. In one embodiment, and by way of example only, an actuator assembly includes a power drive unit, an actuator, a latch rotor, one or more permanent magnets, and an electromagnet. The power drive unit is adapted to receive drive power. The power drive unit is configured, upon receipt of the drive power, to rotate. The actuator is coupled to the power drive unit and is configured, in response to power drive unit rotation, to move to a position. The latch rotor is coupled to the power drive unit to rotate therewith. The one or more permanent magnets are spaced apart from, and at least partially surround, the latch rotor. The permanent magnets supply a permanent magnetic field that opposes rotation of the latch rotor. The electromagnet is adapted to receive a flow of electrical current and, upon receipt thereof, to generate a magnetic field that selectively opposes or aids the permanent magnetic field supplied from the permanent magnets.

In another exemplary embodiment, an actuator drive unit assembly includes a power drive unit, a latch rotor, one or more permanent magnets, and a latch electromagnet. The power drive unit is adapted to receive drive power, and is configured, upon receipt of the drive power, to rotate. The latch rotor is coupled to the power drive unit to rotate therewith. The one or more permanent magnets are spaced apart from, and at least partially surround, the latch rotor, and supply a permanent magnetic field that opposes rotation of the latch rotor. The latch electromagnet is adapted to receive a flow of electrical current and, upon receipt thereof, to generate a magnetic field that selectively opposes or aids the permanent magnetic field supplied from the permanent magnets.

In yet another exemplary embodiment, an actuation control system includes a control circuit, a power drive unit, a latch rotor, one or more permanent magnets, and a latch electromagnet. The control circuit is adapted to receive input signals and is operable, in response thereto, to selectively supply drive control signals and latch control signals. The power drive unit is coupled to receive the drive control signals. The power drive unit is operable, in response to the drive control signals, to rotate. The latch rotor is coupled to the power drive unit to rotate therewith. The one or more permanent magnets are spaced apart from, and at least partially surround, the latch rotor, and supply a permanent magnetic field that opposes rotation of the latch rotor. The latch electromagnet is adapted to receive a flow of electrical current and, upon receipt thereof, to generate a magnetic field that selectively opposes or aids the permanent magnetic field supplied from the permanent magnets.

In still a further exemplary embodiment, an actuation control system, includes a control circuit, a power drive unit, a latch rotor, and an electromagnet. The control circuit is adapted to receive input signals and is operable, in response thereto, to selectively supply drive control signals and latch control signals. The power drive unit is coupled to receive the drive control signals and is operable, upon receipt of the drive control signals, to rotate. The latch rotor is coupled to the power drive unit to rotate therewith. The electromagnet is coupled to receive a flow of current and, upon receipt thereof, to generate a magnetic field force that opposes rotation of the latch rotor. The generated magnetic field force has a magnitude sufficient to prevent rotation of the power drive unit.

DETAILED DESCRIPTION OF PREFERRED EMBODIMENTS

The following detailed description is merely exemplary in nature and is not intended to limit the invention or the application and uses of the invention. Furthermore, there is no intention to be bound by any theory presented in the preceding background or the following detailed description. In this regard, before proceeding with the detailed description, it is to be appreciated that the described embodiment is not limited to use in conjunction with a specific vehicle or system. Thus, although the description is explicitly directed toward an embodiment that is implemented in an aircraft flight surface control system or an aircraft thrust reverser actuation control system, it should be appreciated that it can be implemented in other vehicles and other actuation system designs, including those known now or hereafter in the art.

Figure 1:
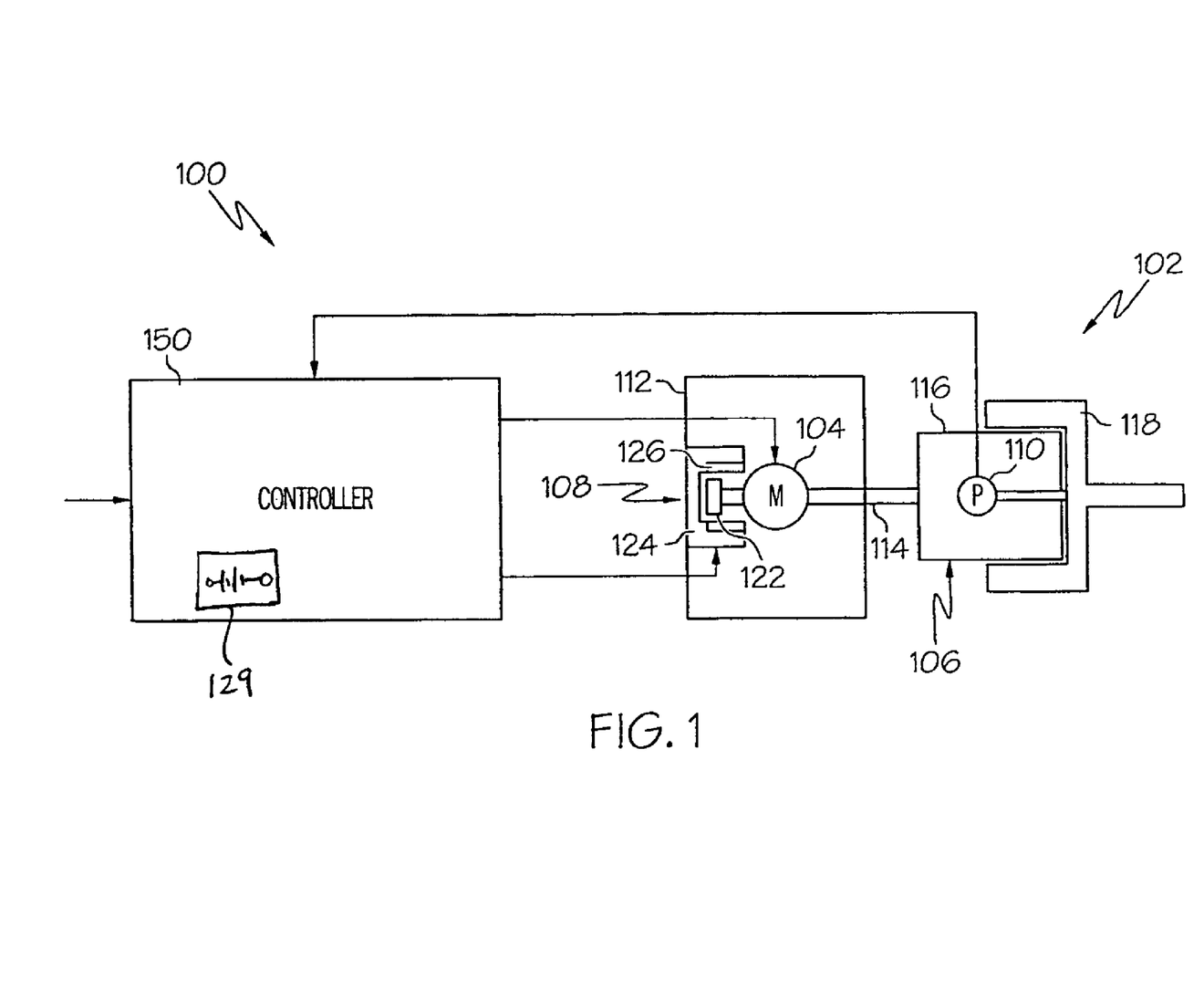
FIG. 1 is a functional block diagram of an exemplary actuation control system according to an embodiment of the present invention.

Turning now to FIG. 1, a functional block diagram of an exemplary actuator control system 100 is shown. The system 100, which may be used to control the movement of, for example, one or more flight control surfaces or one or more thrust reverser system components, includes an actuator assembly 102 and a control circuit 150. The actuator assembly 102 includes a power drive unit 104, an actuator 106, a latch mechanism 108, and a position sensor 110. The power drive unit 104 is preferably implemented as a motor 104, is preferably enclosed within a motor housing 112, and includes an output shaft 114. The motor 104 is preferably implemented an electric motor, and may be any one of numerous types of AC or DC motors now known or developed in the future including, for example, an AC induction motor or a brushed DC motor. In a preferred embodiment, however, the motor 104 is implemented as a brushless DC motor. Although the motor 104 is preferably implemented as an electric motor, it will nonetheless be appreciated that the motor 104 could be implemented, if so desired, as a pneumatic or hydraulic motor. No matter how the motor 104 is specifically implemented, it is configured, upon being properly energized and supplied with actuation position control signals (or being supplied with appropriate operational fluid), to rotate and thereby supply a rotational drive force via the motor output shaft 114.

As FIG. 1 also shows, the motor shaft 114 extends from the motor housing 112 and is coupled to the actuator 106. In the depicted embodiment, the actuator 106 includes an actuation member 116, which is coupled to receive the rotational drive force from the motor output shaft 114, and a translation member 118. In response to the rotational drive force supplied from the motor output shaft 114, the actuation member 116 rotates. The translation member 118 is coupled to the actuation member 116 and is configured, upon rotation thereof, to translate to a position. As will be described in more detail further below, the actuation member 116 and the translation member 118 are preferably implemented as a ballscrew assembly, in which the ballscrew functions as the actuation member 116 and the ballnut functions as the translation member 118. It will be appreciated, however, that this is merely exemplary, and that the actuation member 116 and translation member 118 could be implemented as any one of numerous assemblies that convert rotational motion into translational motion including, for example, jackscrew assemblies and rollerscrew assemblies, just to name a few. It will additionally be appreciated that the actuator 106 could be implemented as any one of numerous other types of actuators including, but not limited to, numerous types of rotary actuators and/or numerous types of linear actuators, just to name a few.

The latch mechanism 108 is preferably disposed within the motor housing 112 and includes a latch rotor 122, an electromagnet 124, and a plurality of permanent magnets 126. The latch rotor 122 is preferably coupled to, or integrally formed as part of, the motor output shaft 114, though it could be coupled to, or integrally formed as part of, any one of numerous other components to effect its function, which is described in more detail further below. In the depicted embodiment the latch rotor 122 is coupled to an end of the output shaft 114 that is opposite to the end that engages the actuator 106. It will be appreciated, however, that this is merely exemplary, and that the rotor could be mounted on the same end of the output shaft 114 that engages the actuator 106. No matter on which end of the motor output shaft 114 it is mounted, the latch rotor 122 is preferably constructed, at least partially, of a magnetically permeable material.

The electromagnet 124 is non-rotationally mounted on, for example, the motor housing 112, and at least partially surrounds the latch rotor 122. The electromagnet 124 is configured, upon being energized with a flow of direct current (DC) from a DC power source, to generate a magnetic field. It will be appreciated that the DC power source may be any one of numerous types of power sources, and may be implemented as part of or remote from the system 100. In the depicted embodiment, the DC power source 129, as is depicted in FIG. 1 and will be described below, is implemented within the control circuit 150. No matter the specific source of the DC current, the magnetic field that is generated opposes the magnetic field that is generated by the permanent magnets 126, thus allowing uninhibited rotation of the motor 104.

The permanent magnets 126 are coupled to the electromagnet 124 and are spaced apart from, and at least partially surround, the latch rotor 122. The permanent magnets 126 are configured to supply a permanent magnetic field that opposes rotation of the latch rotor 122. Thus, when no DC current is supplied to the electromagnet 124 and the motor 104 is not energized for rotation, the permanent magnetic field supplied from the permanent magnets 126 holds the latch rotor 122, and thus the motor output shaft 114, is held in place. As noted above, the electromagnet 124 is energized to generate a magnetic field having a polarity opposite to that of the permanent magnets 126, to allow motor 104 rotation with no resistance from the latch mechanism 108

The position sensor 110, if included, is disposed within the actuator 106, and more specifically within the actuation member 116, and is additionally coupled to the translation member 118. Thus, when the translation member 118 translates in response to actuation member 116 rotation, the portion of the position sensor 110 that is coupled to the translation member 118 translates a commensurate distance. The position sensor 110 is configured to supply a position signal representative of translation member position. As FIG. 1 additionally depicts, the position signal is preferably supplied to the control circuit 150.

The control circuit 150 selectively supplies the actuation position control signals to the motor 104, and latch control signals to the latch mechanism 108. The control circuit 150 is configured to receive external control signals from one or more external sources (not shown in FIG. 1). In response to these control signals, the control circuit 150 supplies the actuation position control signals to the motor 104 and latch control signals to the latch mechanism 108. The actuation position control signals appropriately energize the motor 104 to rotate in the direction that will cause the translation member 118 to move to a desired position. The latch control signals may be in the form of DC current that flows through the electromagnet 124, or in the form of a control signal that causes a separate power source to supply the DC current flow through the electromagnet 124. In either case, the DC current flow, as noted above, appropriately energizes the electromagnet 124 to generate a magnetic field that opposes the permanent magnetic field supplied from the permanent magnets 126. The control circuit 150, using the actuation position signals from the actuator position sensor 110 as feedback, implements a closed-loop control loop to move the actuator 106 to the desired position. It will be appreciated that the DC current flow to the electromagnet 124 could also be used to generate a magnetic field that aids in the holding force of the latch mechanism 104.

When the actuator 106 attains the desired position, the control circuit 150 no longer supplies the actuation position control signals to the motor 104, but continues to supply latch control signals to the electromagnet 124. More specifically, the latch control signals supplied to the electromagnet 124 now generates a magnetic field that interacts with and aids the permanent magnetic field supplied from the permanent magnets 126. The magnetic fields together interact with the latch mechanism rotor 122 and prevent further rotation of the motor output shaft 114. It will be appreciated that the control circuit 150 may be configured to implement any one of numerous control schemes. For example, the control circuit 150 may be a flight surface control circuit that is configured to implement one or more aircraft flight surface control schemes, or an aircraft thrust reverser actuation control circuit that is configured to implement one or more thrust reverser actuation control schemes, just to name a few.

With reference to FIGS. 2-5, various exemplary embodiments of particular physical implementations of the latch mechanism 108 described above are depicted, and will now be described in more detail. The latch rotor 122, as noted above, is configured to be mounted on the motor output shaft 114, and includes a main body 202 and a plurality of lobes 204 extending radially therefrom. As noted above, the latch assembly 122 is at least partially constructed of a magnetically permeable material. In this regard, at least the lobes 204, or at least portions thereof, are constructed of a magnetically permeable material. It will be appreciated, however, that the entire latch rotor 122 could be constructed of a magnetically permeable material.

Figure 2:
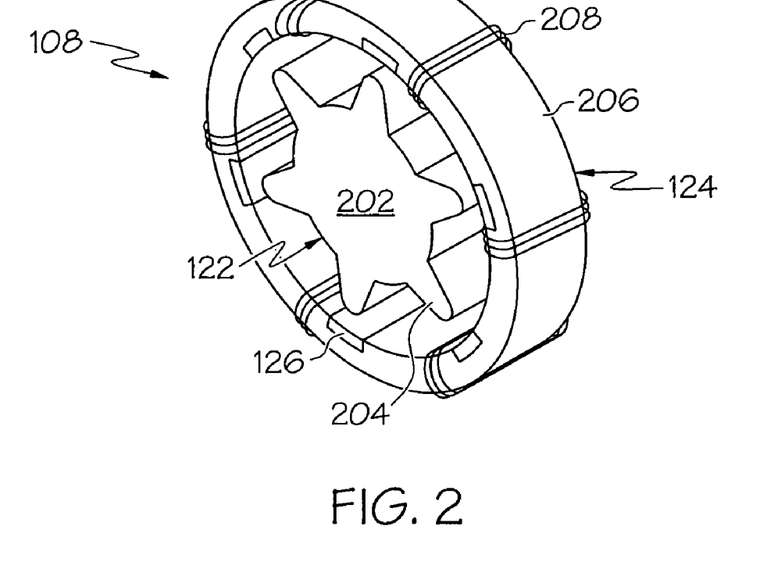
FIGS. 2 and 3 are perspective and end views, respectively, of an exemplary physical implementation of an electromagnetic latch mechanism that may be used to in the system of FIG. 1.
Figure 3:
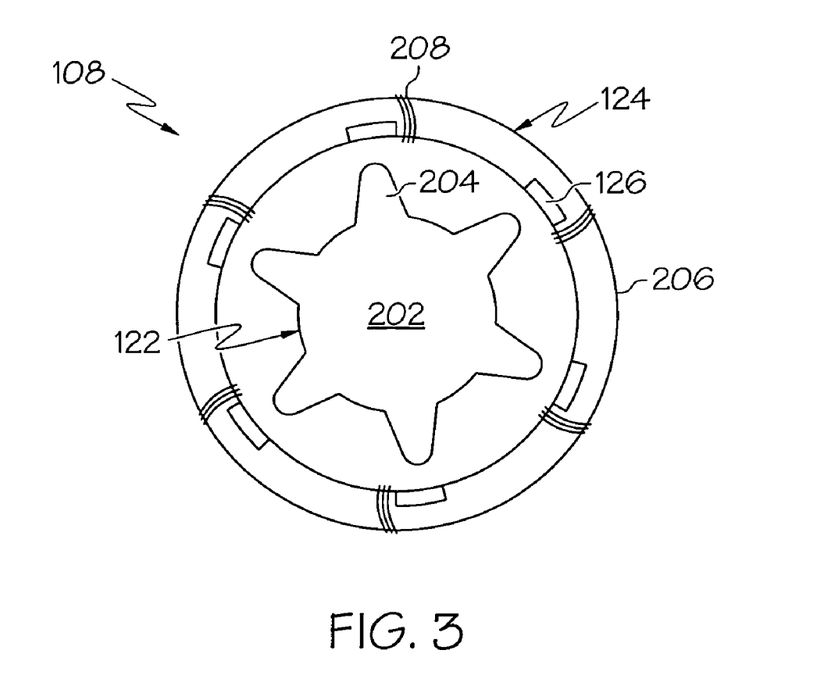
Figure 4:
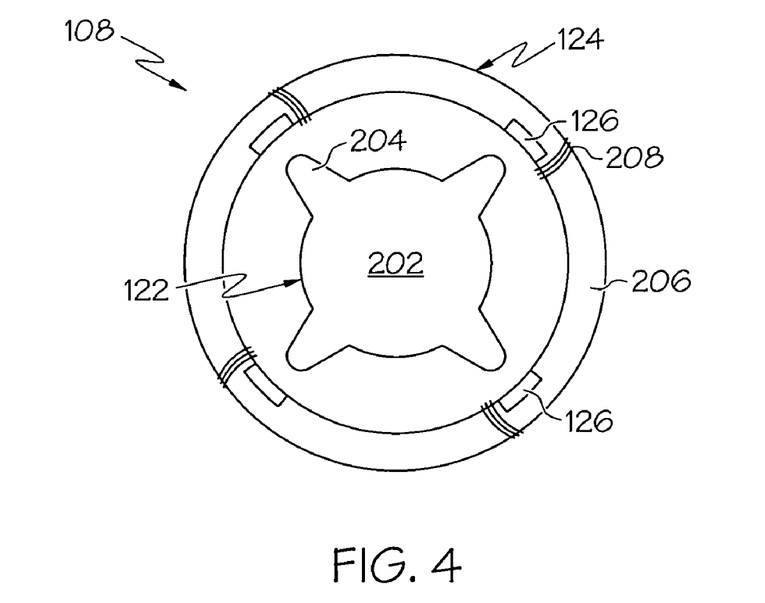
FIGS. 4 and 5 are end views of exemplary alternative embodiments of the electromagnetic latch mechanism depicted in FIGS. 2 and 3.
Figure 5:
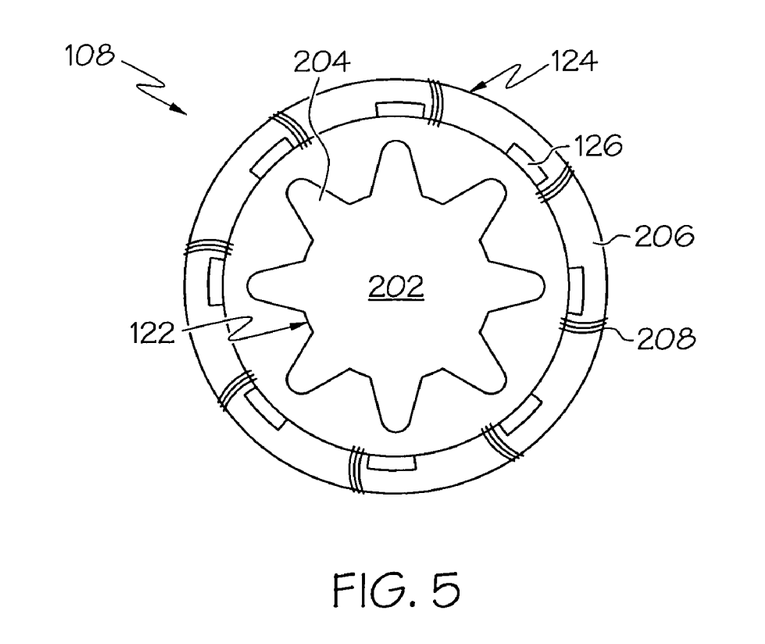
Figure 6:
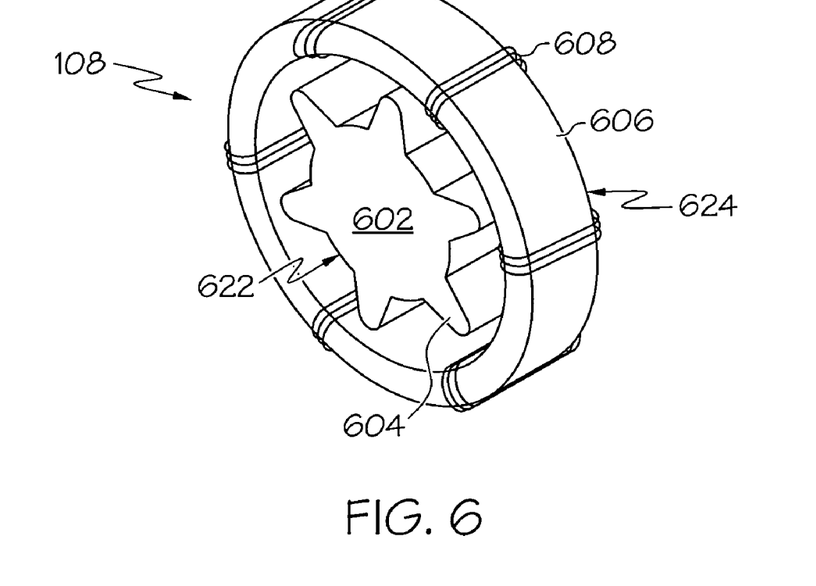
FIGS. 6 and 7 are perspective and end views, respectively, of an exemplary physical implementation of yet another alternative embodiment of an electromagnetic latch mechanism that may be used to in the system of FIG. 1.
Figure 7:
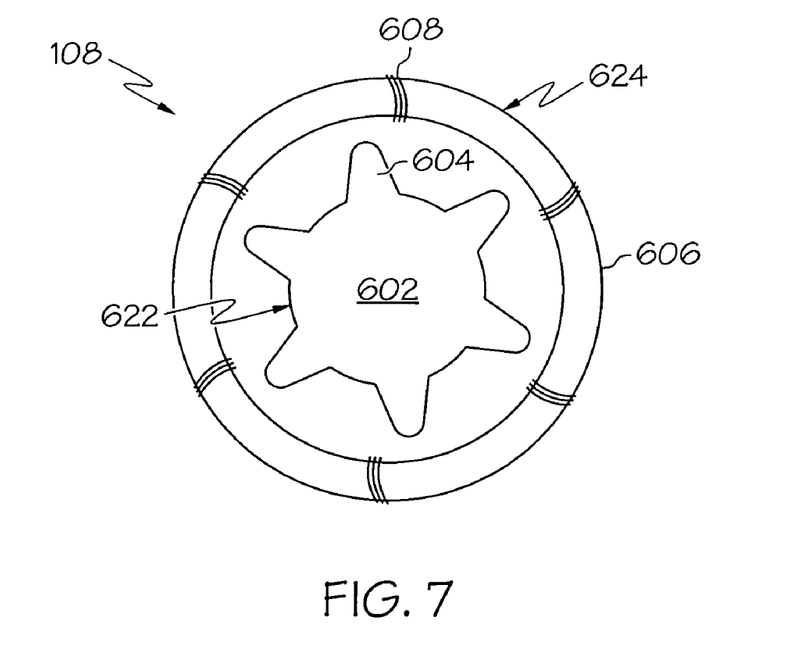
Figure 8:
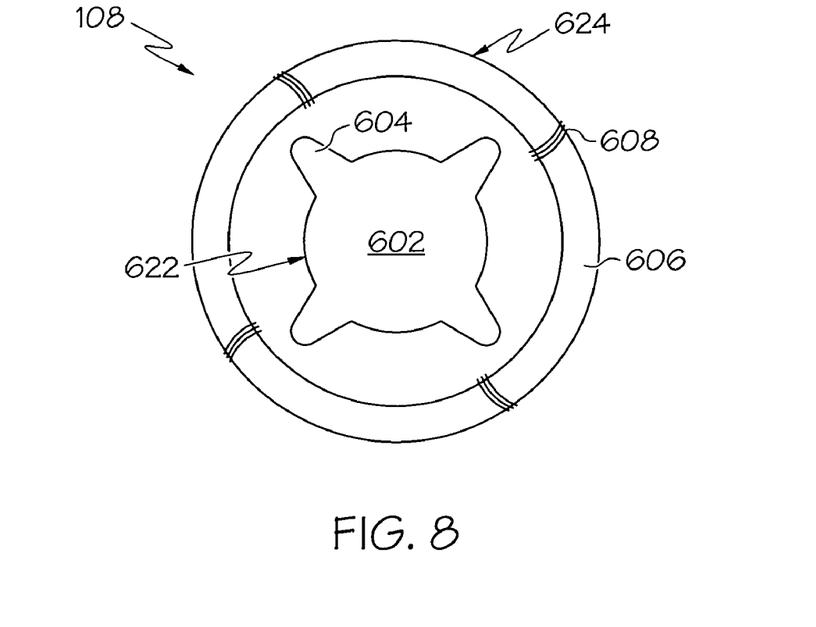
FIGS. 8 and 9 are end views of exemplary alternative embodiments of the electromagnetic latch mechanism depicted in FIGS. 6 and 7.
Figure 9:
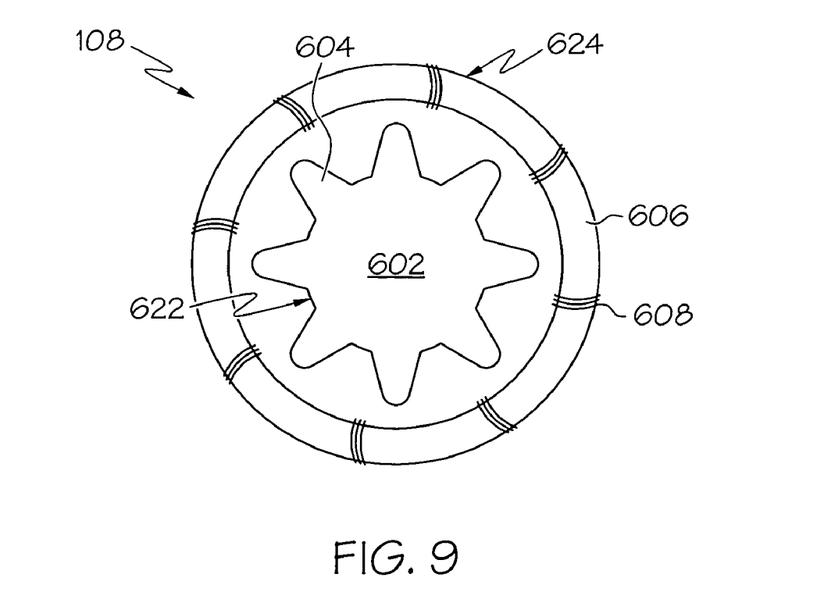

The electromagnet 124 includes a latch stator 206, and a plurality of latch coils 208. The latch stator 206 is configured to be mounted on the motor housing 112, and at least partially surrounds the latch rotor 122. The permanent magnets 126 are preferably disposed within the latch stator 206, and the latch coils 208 are wound around the latch stator 206 adjacent each of the permanent magnets 126. The latch coils 208 are wound in a manner that, upon being energized with DC current, the latch coils 208 generate the same number of magnetic pole pairs as there are permanent magnets 126, and in a manner that opposes or aids the permanent magnetic field supplied from each permanent magnet 126. When current flows through the latch coils 208 in one direction, the generated magnetic pole pairs oppose the permanent magnetic field supplied from each permanent magnet 126, and when current flows through the latch coils 208 in the opposite direction, the generated magnetic pole pairs aid the permanent magnetic field supplied from each permanent magnet 126. In FIGS. 2 and 3 it is seen that the latch rotor 122 includes six lobes 204, thus there are three permanent magnet pole pairs and the latch coils 208 are wound on the latch stator 206 in a manner that generates three magnetic pole pairs. Alternatively, in the embodiment depicted in FIG. 4 the latch rotor 122 includes four lobes 204, so there are two permanent magnet pole pairs and the latch coils 208 are wound on the latch stator 206 in a manner that generates two magnetic pole pairs, and in the embodiment depicted in FIG. 5, the latch rotor 122 includes eight lobes 204, so there are four permanent magnet pole pairs and the latch coils 208 are wound on the latch stator 206 in a manner that generates four magnetic pole pairs.

The latch mechanism 108 depicted in FIGS. 2-5 and described above, included both an electromagnet 124 and one or more permanent magnets 126, and relied on the application of electrical power to release the latch mechanism 108. In an alternative embodiment, the latch mechanism 108 is implemented without any permanent magnets, and relies on power to hold the latch mechanism 108. For example, in various alternative embodiments depicted in FIGS. 6-9, the latch mechanism 108, similar to the previously described embodiments, includes a latch rotor 622 and an electromagnet 624. The latch rotor 622 in these alternative embodiments may be constructed similar to the latch rotor 122 of any of the previously described embodiments, and may thus be fully or partially constructed of magnetically permeable material, and may have any one of numerous numbers of lobes 604 extending radially from the latch rotor main body 602.

The electromagnet 624, also similar to the previously described embodiments, includes a latch stator 606 and a plurality of latch coils 608. The latch stator 606 is configured to be mounted on the motor housing 112, and at least partially surrounds the latch rotor 622. The latch coils 608 are wound around the latch stator 606 in such a manner that, upon being energized with DC current, the latch coils 608 generate as many magnetic pole pairs as there are lobes 604 on the latch rotor 622. For example, in FIGS. 6 and 7 the latch rotor 622 includes six lobes 604, so the latch coils 608 are wound on the latch stator 606 in a manner that generates six magnetic pole pairs, in FIG. 8 the latch rotor 622 includes four lobes 604, so the latch coils 608 are wound on the latch stator 606 in a manner that generates four magnetic pole pairs, and in FIG. 9 the latch rotor 622 includes eight lobes 604, so the latch coils 608 are wound on the latch stator 606 in a manner that generates eight magnetic pole pairs.

Figure 10:
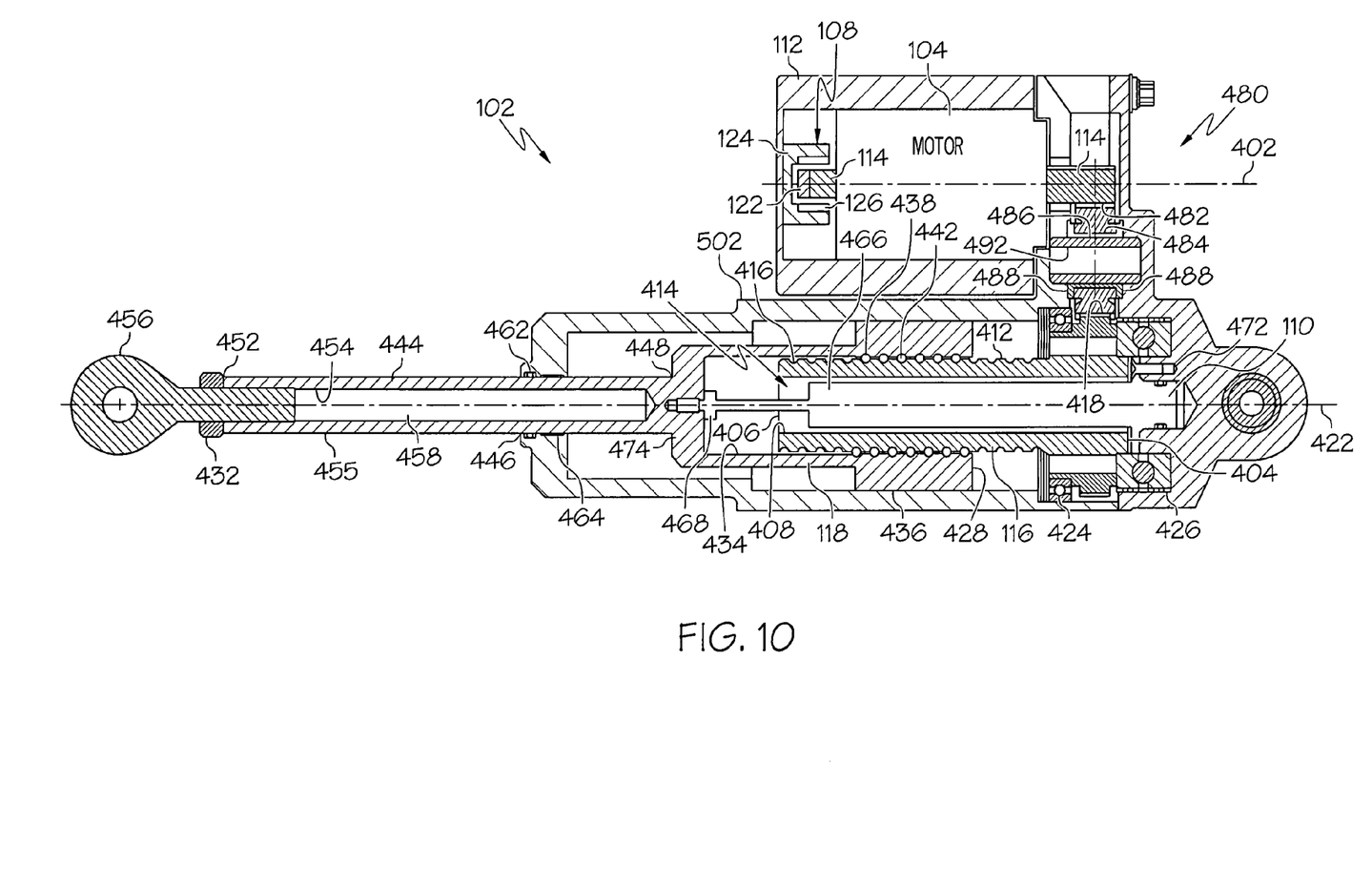
FIG. 10 is a cross section view of an exemplary actuator assembly that may be used in the system of FIG. 1, and may include the electromagnetic latch mechanisms shown in FIGS. 2-5.

For completeness, and to illustrate and describe how the latch assemblies 108 described above may be implemented into an actual actuator assembly 102, an exemplary physical implementation of the actuator assembly 102 of FIG. 1, which may incorporate any one of the latch mechanisms 108 of FIGS. 1-9, is depicted in FIG. 10. Before doing so, however, it is noted that the actuator assembly 102 that is depicted in FIG. 10 is merely exemplary of any one of numerous types of actuator assemblies 102 that may incorporate the latch mechanism 108. Moreover, although the actuator assembly 102 is depicted and described as being implemented with any one of the latch mechanisms 108 depicted in FIGS. 1-5, it will be appreciated that this is merely exemplary and that the actuator assembly 102 could readily be implemented with any one of the latch mechanisms 108 depicted in FIGS. 6-9. It is additionally noted that the actuator assembly 102 depicted in FIG. 10 includes physical implementations of the various actuator components described above, and which for convenience are labeled using like reference numerals as in FIG. 1.

Turning now to the description of the depicted actuator assembly 102, it is seen that it includes the motor 104, the actuation member 116, the translation member 118, and the position sensor 110 all disposed at least partially within, or on, a single actuator housing assembly 502. The actuator housing assembly 502 completely encloses each of these components, with the exception of the motor 104. The motor 104 is instead mounted within the motor housing 112, which is separately mounted to the actuator housing assembly 502. The actuator housing assembly 502 and motor housing 112 are configured such that, upon being coupled to one another, the motor output shaft 114 extends into the actuator housing assembly 502. The actuator housing assembly 502 additionally includes one or more non-illustrated electrical connectors such as, for example, a motor connector, a latch connector, and a sensor connector that are adapted to receive one or more non-illustrated cables. The motor connector is used to electrically interconnect the control circuit 150 and the motor 104, the latch connector is used to interconnect the control circuit 150 and the latch assembly 108, and the sensor connector is used to electrically interconnect the control circuit 150 and the position sensor 110. Alternatively, one or more wire harnesses or pigtails could be used instead of the associated connectors.

Turning now to a description of the components mounted within, or on, the actuator housing assembly 502, it will be appreciated that the motor 104 both functions and is configured as described above. Thus, the motor 104 is preferably a brushless DC motor that is mounted within the motor housing 112. The motor 104 receives actuator position command signals from the control circuit 150, via the non-illustrated motor connector. In response to the actuator position command signals, the motor 104 rotates in the commanded direction, along a rotational axis 402, to supply a rotational drive force to the actuation member 116. As will be described in more detail further below, in the depicted embodiment the rotational drive force is supplied to the actuation member 116 via one or more gears.

The actuation member 116, which as noted above is preferably implemented as a ballscrew, is rotationally mounted within the actuator housing assembly 502, and includes a first end 404, a second end 406, an inner surface 408, and an outer surface 412. The ballscrew inner surface 408 defines a substantially cylindrical sensor passageway 414 that extends at least partially through the ballscrew 116. The ballscrew outer surface 412 has a plurality of ball grooves (or "threads") 416 formed thereon and has an input gear 418 coupled thereto proximate the ballscrew first end 404. The input gear 418 receives the rotational drive force from the motor 104, via the above-mentioned one or more gears, which in turn causes the ballscrew 116 to rotate about a rotational axis 422 that is parallel to, and displaced from, the motor rotational axis 402.

A plurality of bearing assemblies, which includes a ball bearing assembly 424 and a thrust bearing assembly 426, are mounted within the actuator housing assembly 502. The ball bearing assembly 424 is used to rotationally support the ballscrew 116 in the actuator housing assembly 502, and the thrust bearing assembly 426, which is preferably disposed between the actuator housing assembly 502 and the ballscrew first end 404, transfers any axial force supplied to the ballscrew 116 to the actuator housing assembly 502.

As was also noted above, the translation member 118 is preferably implemented as a ballnut, and is disposed at least partially around the ballscrew 116. The ballnut 118, similar to the ballscrew 116, includes a first end 428, a second end 432, an inner surface 434, and an outer surface 436. The ballnut 118 is mounted against rotation within the actuator housing assembly 502 and is configured, in response to rotation of the ballscrew 116, to translate axially within the actuator housing assembly 502. In the depicted embodiment, a portion of the ballnut outer surface 436, proximate the ballnut first end 428, is disposed at least partially within a groove or slot (not shown) formed in a section of the actuator housing assembly 502, to thereby prevent its rotation. Alternatively, the ballnut outer surface 436 could have a groove or slot formed therein in which a section of the actuator housing assembly 502 is inserted. Moreover, it will be appreciated that the ballnut 118 could be mounted against rotation in any one of numerous manners.

The ballnut 118, similar to the ballscrew 116, has a plurality of ball grooves (or "threads") 438 formed therein. However, unlike the ballscrew ball grooves 416, the ballnut ball grooves 438 are formed in a section of the ballnut inner surface 434, proximate the ballnut first end 428. A plurality of recirculating balls 442 are disposed within the ballnut ball grooves 438, and in selected ones of the ballscrew ball grooves 416. The balls 442, in combination with the ball grooves 416, 438, convert the rotational movement of the ballscrew 116 into the translational movement of the ballnut 118. It will be appreciated that the direction in which the ballnut 118 travels will depend on the direction in which the ballscrew 116 rotates.

The ballnut 118 includes a shaft section 444 that extends through an opening 446 in the actuator housing assembly 502. The shaft 444 includes a first end 448, a second end 452, an inner surface 454, and an outer surface 455. The shaft first end 448 is disposed within the actuator housing assembly 502, whereas the shaft second end 452 is disposed external thereto and has a rod end assembly 456 coupled thereto. The rod end assembly 456 is configured to couple the ballnut 118 to a component (not shown), such as an aircraft or missile flight surface or a missile thrust vectoring nozzle, so that the actuator assembly 102 can move the component to the position commanded by the control circuit 150.

The shaft inner surface 454 forms a cavity 458 that has an open first end disposed in the shaft second end 452, and extends to a closed second end that is formed proximate the shaft first end 448. A seal 462 and a bushing 464 are disposed within the housing assembly opening 446 and surround that portion of the shaft outer surface 455 that is disposed within the opening 446. The seal 462 prevents dust, particulate, or other debris from ingress into the actuator housing assembly 502.

The position sensor 110 is disposed at least partially within the ballscrew 116 and is additionally coupled to the ballnut 118. More specifically, in the depicted embodiment the position sensor 110 is implemented as a linear variable differential transformer (LVDT) that includes a differential transformer (not shown) disposed within a sensor housing 466, and a movable slug 468. The sensor housing 466 is coupled to the actuator housing assembly 502 via one or more fasteners 472, and extends into the sensor passageway 414 formed in the ballscrew 116. The movable slug 468 is coupled to the ballnut 118, via a slug mount 474 that is formed on the ballnut inner surface 434, and is movably disposed within, and extends from, the sensor housing 466.

The differential transformer, as is generally known, includes at least a non-illustrated primary winding, and a non-illustrated differentially wound secondary winding. The transformer primary winding is energized with an AC signal supplied from, for example, the control circuit 150 via the non-illustrated sensor connector, and the secondary winding supplies a position signal representative of the position of the movable slug 468 to, for example, the control circuit 150 via the non-illustrated sensor connector. Because the movable slug 468 is coupled to the ballnut 118, the movable slug 468 translates whenever the ballnut 118 translates. Thus, the position signal supplied from the secondary winding is representative of the position of the ballnut 118, which may in turn be correlated to the position of the element to which the actuator 100 is coupled.

It will be appreciated that an LVDT is merely exemplary of a particular preferred position sensor 110, and that the position sensor 110 may be implemented using any one of numerous other sensing devices now known, or developed in the future. Examples of alternative position sensors include, but are not limited to, a rotary variable differential transformer (RVDT), a potentiometer, a resolver, one or more Hall sensors, and one or more optic sensors.

As was mentioned above, the rotational drive force of the motor 104 is supplied to the ballscrew 116 via a gear assembly 480. It will be appreciated that the gear assembly 480 may be implemented using any one of numerous gear arrangements, now known or developed in the future, that may be configured with a step-down gear ratio so that a desired rotational speed reduction of the motor output shaft 114 rotational speed occurs. It will additionally be appreciated that the rotational speed reduction provided by the gear assembly 480 may vary to achieve a desired torque-speed characteristic for the actuator assembly 102.

In the depicted embodiment, the gear assembly 480 includes a motor output gear 482, an idler gear 484, and the previously mentioned ballscrew input gear 418. More specifically, it is seen that the motor output gear 482 is coupled to, or is integrally formed on, the motor output shaft 114, and engages the idler gear 484. The idler gear 484 is rotationally mounted within the actuator housing assembly 502 via a roller bearing 486 and a pair of thrust washers 488. The roller bearing 486 and thrust washers 488 are in turn mounted on a bearing shaft 492, which is mounted against rotation. The idler gear 484, in addition to engaging the motor output gear 482, engages the ballscrew input gear 418.

With the above described gear assembly configuration, the idler gear 484 receives, via the motor output gear 482, the rotational drive force supplied by the motor 104. The idler gear 484, in response to the received rotational drive force, rotates and supplies the rotational drive force to the ballscrew input gear 418. In response, the ballscrew 116 rotates, which in turn causes the ballnut 118 to translate.

The latch mechanism 108 is disposed within the motor housing 112, with the latch rotor 122 mounted on the motor output shaft 114 at an end thereof that is opposite the end that engages the gears. The electromagnet 124, which includes the latch stator 206 and the plurality of coils 208 wound there-around (neither shown in FIG. 6), and the permanent magnets 126 are non-rotationally mounted on the motor housing 112 and at least partially surround the latch rotor 122. Should the electromagnet 124 or DC power source become inoperable, the permanent magnets 126 will continue to provide the desired no-back function.

It will be appreciated that if any of the alternative latch mechanisms 108 depicted in FIGS. 6-9 and described above are used, these latch mechanisms 108 would preferably be mounted similar to what was just described. That is, the latch rotor 622 would mounted on the motor output shaft 114 at an end thereof that is opposite the end that engages the gears, and the electromagnet 624, which would include the latch stator 606 and the plurality of coils 608 wound there-around, would be non-rotationally mounted on the motor housing 112 and would at least partially surround the latch rotor 622.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An actuator assembly, comprising:
   a power drive unit adapted to receive drive power and configured, upon receipt of the drive power, to rotate;
   an actuator coupled to the power drive unit and configured, in response to power drive unit rotation, to move to a position;
   a latch rotor coupled to the power drive unit to rotate therewith, the latch rotor comprising a main body having N-number of lobes extending radially therefrom, N being a number greater than one;
   (N/2)-number of permanent magnet pole pairs spaced apart from and at least partially surrounding the latch rotor, each of the permanent magnet pole pairs supplying a permanent magnetic field that opposes rotation of the latch rotor; and
   an electromagnet adapted to receive a flow of electrical current and configured, upon receipt thereof, to generate a magnetic field that simultaneously opposes all of the permanent magnetic fields supplied from the permanent magnet pole pairs or simultaneously aids all of the permanent magnetic fields supplied from the permanent magnet pole pairs, the electromagnet comprising:
   a latch stator non-rotationally mounted adjacent to, and at least partially surrounding, the latch rotor, the latch stator having the permanent magnet pole pairs mounted thereon, and
   a plurality of latch windings wound around at least a portion of the latch stator, the latch windings disposed adjacent the magnet pole pairs and adapted to receive the flow of electrical current, the latch windings wound on the latch stator such that, upon receipt of the flow of electrical current, the latch windings simultaneously generate the same number of magnetic pole pairs as there are permanent magnet pole pairs.

2. The actuator assembly of claim 1, wherein at least a portion of each of the plurality of lobes comprises a magnetically permeable material.

3. The actuator assembly of claim 1, wherein the actuator comprises:
   an actuation member coupled to the power drive unit and configured, in response to rotation of the power drive unit, to rotate.

4. The actuator assembly of claim 3, wherein the actuator further comprises:
   a translation member disposed adjacent the actuation member and configured, upon rotation of the actuation member, to translate to a position.

5. The actuator assembly of claim 4, wherein:
the actuation member comprises a ballscrew; and
the translation member comprises a ballnut mounted against rotation on the ballscrew and configured, upon rotation of the ballscrew, to translate to the position.

6. An actuator drive unit assembly, comprising:
a power drive unit adapted to receive drive power and configured, upon receipt of the drive power, to rotate;
a latch rotor coupled to the power drive unit to rotate therewith, the latch rotor having N-number of lobes extending radially therefrom, N being a number greater than one;
(N/2)-number of permanent magnet pole pairs spaced apart from and at least partially surrounding the latch rotor, each of the permanent magnet pole pairs supplying a permanent magnetic field that opposes rotation of the latch rotor; and
an electromagnet adapted to receive a flow of electrical current and, upon receipt thereof, to generate a magnetic field that simultaneously opposes all of the permanent magnetic fields supplied from the permanent magnet pole pairs or simultaneously aids all of the permanent magnetic fields supplied from the permanent magnet pole pairs, the electromagnet comprising:
a latch stator non-rotationally mounted adjacent to, and at least partially surrounding, the latch rotor, the latch stator having the permanent magnet pole pairs mounted thereon, and
a plurality of latch windings wound around at least a portion of the latch stator, the latch windings disposed adjacent the magnet pole pairs and adapted to receive the flow of electrical current, the latch windings wound on the latch stator such that, upon receipt of the flow of electrical current, the latch windings simultaneously generate the same number of magnetic pole pairs as there are permanent magnet pole pairs.

7. The assembly of claim 6, wherein at least a portion of each of the plurality of lobes comprises a magnetically permeable material.

8. An actuation control system, comprising:
a control circuit adapted to receive input signals and operable, in response thereto, to selectively supply drive control signals and latch control signals;
a power drive unit coupled to receive the drive control signals and operable, in response to the drive control signals, to rotate;
a latch rotor coupled to the power drive unit to rotate therewith;
a plurality of permanent magnets spaced apart from and at least partially surrounding the latch rotor, each of the permanent magnets supplying a permanent magnetic field that opposes rotation of the latch rotor; and
a latch electromagnet coupled to receive the selectively supplied latch control signals and configured, when the latch control signals are supplied, to generate a magnetic field that (i) simultaneously opposes the permanent magnetic fields supplied from all of the permanent magnets or simultaneously aids the permanent magnetic fields supplied from all of the permanent magnets and (ii) does not induce a torque in the latch rotor wherein the latch electromagnet comprises:
a latch stator non-rotationally mounted adjacent to, and at least partially surrounding, the latch rotor, and
a plurality of latch windings wound around at least a portion of the latch stator, the latch windings coupled to receive the selectively supplied latch control signals and configured, when the latch control signals are supplied, to generate the magnetic field,
wherein the permanent magnets are mounted on the latch stator and are disposed adjacent each of the latch windings.

9. The system of claim 8, wherein:
each of the one or more permanent magnets has one or more pole pairs; and
the coils are wound on the latch stator such that, upon receipt of the latch control signals, the coils generate the same number of magnetic pole pairs as there are permanent magnets.

10. The system of claim 8, wherein:
the latch rotor comprises a main body having a plurality of lobes extending radially therefrom.

11. The assembly of claim 10, wherein at least a portion of each of the plurality of lobes comprises a magnetically permeable material.

12. The system of claim 8, further comprising:
a power source coupled to receive the latch control signals and operable, upon receipt thereof, to supply the flow of electrical current to the electromagnet.

* * * * *